Feb. 9, 1965 W. R. KLING 3,169,162
SONAR SIMULATOR
Filed July 6, 1962 5 Sheets-Sheet 1

INVENTOR.
WILLIAM R. KLING
BY
Roger W. Jensen
ATTORNEY

Feb. 9, 1965  W. R. KLING  3,169,162
SONAR SIMULATOR
Filed July 6, 1962  5 Sheets-Sheet 2

FIG. 2

*INVENTOR.*
WILLIAM R. KLING
BY
Roger W. Hensen
ATTORNEY

INVENTOR.
WILLIAM R. KLING
BY Roger W. Jensen
ATTORNEY

Feb. 9, 1965 W. R. KLING 3,169,162
SONAR SIMULATOR
Filed July 6, 1962 5 Sheets-Sheet 4

INVENTOR.
WILLIAM R. KLING
BY Roger W. Jensen
ATTORNEY

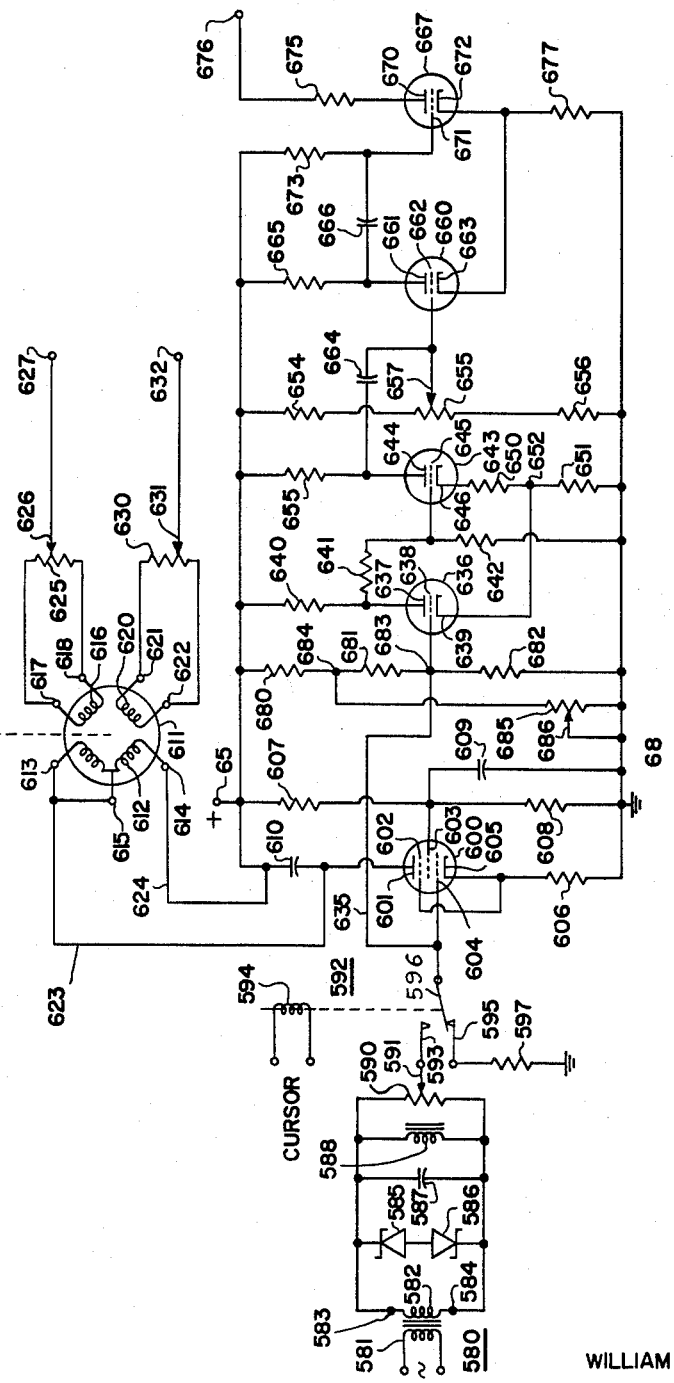

United States Patent Office 3,169,162
Patented Feb. 9, 1965

3,169,162
SONAR SIMULATOR
William R. Kling, Temple City, Calif., assignor to Honeywell Inc., a corporation of Delaware
Filed July 6, 1962, Ser. No. 207,980
9 Claims. (Cl. 35—10.4)

This invention pertains to improvements in teaching devices and more particularly to improvements in a sonar simulator.

In a broad sense the invention comprises a sonar simulator wherein $x$ and $y$ signals, corresponding to E–W and N–S ocean positions respectively, from position generator potentiometers of both the target and own ship are summarized to obtain relative range and bearing data. The peak amplitude of the summarized signal represents relative range while the phase of the summarized signal represents relative bearing. The summarized signal is peak rectified and compared with a video sweep range sawtooth voltage. Upon coincidence a positive pulse appears at the output of the coincidence circuit. The phase of the summarized signal is detected in a Schmitt trigger which provides a pulse whose rise is differentiated resulting in a sharp bearing pulse. Both the range and bearing detection pulses are observed by an "and" gate which permits video display of the target.

A rotating direction transmission (RDT) sector center bearing is established by the shaft position of a resolver. Constant amplitude sine and cosine signals energize the resolver resulting in a constant amplitude output whose phase is controlled by the resolver shaft position.

The constant amplitude output of the resolver is clipped in a saturating amplifier to obtain a square wave pulse. Clipping occurs at a D.C. voltage level controlled by an RDT Xmit sector width potentiometer which establishes the bias level of the saturating amplifier. The pulse appearing at the output of the saturating amplifier represents the RDT sector whose center line is the transmit sector center. This pulse is also applied to the range and bearing "and" gate mentioned above.

The present invention also includes means for simulating the detection of Doppler signals in a relatively narrow sector centered on the cursor. A cursor Doppler bearing resolver produces an A.C. output signal of constant amplitude whose phase varies with the bearing setting of the cursor. The output of the bearing resolver is fed to the input of a Schmitt trigger.

The Schmitt trigger and the bearing resolver are adjusted such that the Schmitt trigger produces a 180° wide positive output pulse having its leading edge located at the time relationship which is equal to the bearing setting of the cursor. The output pulse of the Schmitt trigger is differentiated resulting in a pulse having a pulse width corresponding to approximately 16° centered on the cursor bearing. This signal is applied to an input of an "and" gate.

A pulse from the range and bearing generating circuit, explained previously, is fed to a second input of the Doppler circuit "and" gate. This pulse from the range and bearing generating unit is indicative of target bearing.

The output of the "and" gate drives a multivibrator which in turn energizes a relay which connects the output of a target speed resolver to the input of a Doppler echo resolver.

The target speed resolver has outputs indicative of the target rate. The Doppler echo resolver is varied in accordance with the cursor bearing, the output of the Doppler echo resolver is an A.C. signal proportional to target speed along the line of sound between own ship and target ship. The output of the Doppler echo resolver is discriminated to provide a D.C. signal whose polarity indicates an approaching or receding target and its amplitude indicates the rate that the target is approaching or receding. A voltage controlled oscillator is controlled by the D.C. signal, the output of the voltage control oscillator is amplified and displayed aurally.

It is one object of this invention therefore to provide an improved sonar simulator circuit.

Another object of this invention is to provide a sonar simulator circuit having improved means for generating the relative range and bearing of targets.

A further object of this invention is to provide a sonar simulator having improved means for Doppler detection.

A further object of this invention is to provide a sonar simulator circuit having means for simulating a rotating direction transmission sector.

These and other objects of my invention will become apparent to those skilled in the art upon consideration of the accompanying specification, claims, and drawings of which:

FIGURES 1 through 3 are a schematic representation of the target relative range and bearing detection, the RDT sector width and sector center detection, and Doppler detection circuits;

FIGURE 5 is a schematic representation of the cursor generating circuit.

Figure 1:
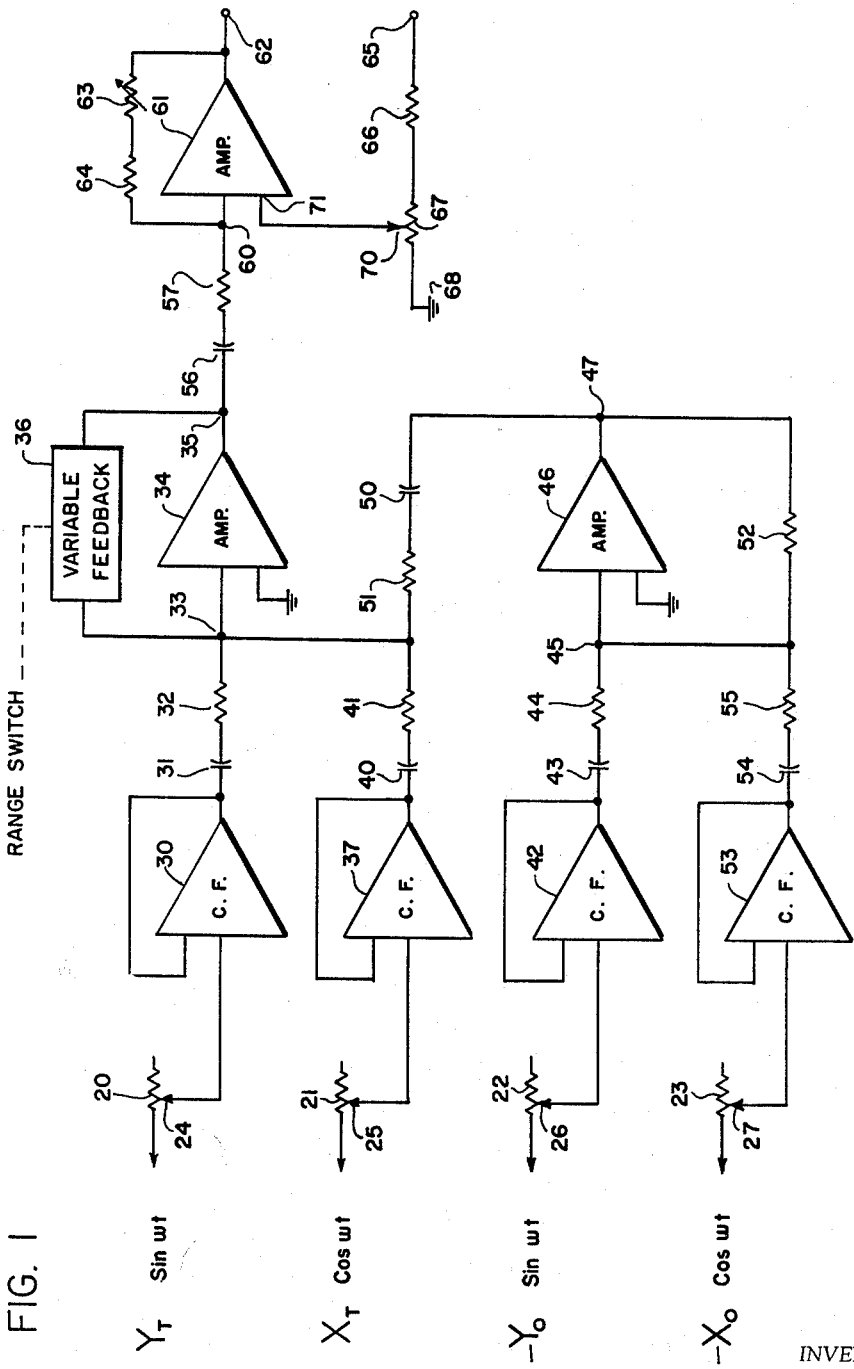

Referring to FIGURE 1, there is shown position generator helipots 20, 21, 22 and 23. Helipots 20 and 21 are the $y$ axis position generators and the $x$ axis position generators respectively for a target, while helipots 22 and 23 are the $y$ axis position generator and the $x$ axis position generator respectively for own ship. A sine wave signal is applied across each position generator helipot for $y$ axis position generation. A sine wave, whose phase is 90° with respect to the sine wave applied to the $y$ axis, is applied to the position generator helipot which generate the $x$ position of the target.

Helipots 20, 21, 22 and 23 have wipers 24, 25, 26 and 27 respectively.

Wiper 24 of helipot 20 is connected to the input of a cathode follower 30. The output of cathode follower 30 is connected through a capacitor 31 in series with a resistor 32 to an input 33 of an amplifier 34. An output 35 of amplifier 34 is connected by means of a variable feedback network 36 to the input 33 of amplifier 34. The feedback network 36 of amplifier 34 is varied in accordance with sonar range.

Wiper 25 of helipot 21 is connected to the input of a cathode follower 37. The output of cathode follower 37 is connected by means of a capacitor 40 in series with a resistor 41 to the input 33 of amplifier 34.

Wiper 26 of helipot 22 is connected to the input of a cathode follower 42. The output of cathode follower 42 is connected by means of a capacitor 43 in series with a resistor 44 to an input 45 of an amplifier 46. An output 47 of amplifier 46 is connected by means of a capacitor 50 in series with a resistor 51 to the input 33 of amplifier 34, and by means of a resistor 52 to the input 45 of amplifier 46.

Wiper 27 of helipot 23 is connected to an input of a cathode follower 53. The output of cathode follower 53 is connected by means of a capacitor 54 in series with the resistor 55 to the input 45 of amplifier 46.

The output 35 of amplifier 34 is connected by means of a capacitor 56 in series with a resistor 57 to an input 60 of an amplifier 61. An output 62 of amplifier 61 is connected by means of a variable resistor 63 in series with a fixed resistor 64 to the input 60 of amplifier 61. The positive source of energizing potential 65 is connected by means of a resistor 66 in series with a potentiometer 67 to ground 68. A wiper 70 of potentiometer 67 is connected to a bias input 71 of amplifier 61.

Referring to FIGURE 2 there is shown the terminal 62 (see FIGURE 1) connected to a rectifier circuit 73. The output of rectifier 73 is connected to an input 74 of a coincidence detector 75. Coincidence detector 75 further has an input 76. The output of coincidence detector 75 is connected to the input of a multivibrator 77. The output of multivibrator 77 is connected by means of a resistor 80 in series with a resistor 81 to a source of negative potential 82. A junction 83 between resistors 80 and 81 is connected to the cathode 84 of a diode 85. The anode of diode 85 is connected by means of a conductor 86 and a resistor 87 to the positive potential source 65. Conductor 86 is connected by means of a resistor 90 in parallel with a reverse-poled diode 91 to ground 68.

A sawtooth oscillator 93 has an output 94 which is connected by means of a conductor 95 and a resistor 96 to an input 97 of an amplifier 98. The output of amplifier 98 is connected to an input of a cathode follower 100. The output of cathode follower 100 is connected by means of a conductor 101 to the input 76 of coincidence detector 75, and by means of a variable resistor 102, a resistor 103, and a resistor 104 to ground 68. A junction 105 between resistors 103 and 104 is connected to a feedback input 106 of amplifier 98. The positive potential source 65 is connected by means of a resistor 107 in series with a potentiometer 110 to ground 68. Potentiometer 110 has a wiper 111 which is connected by means of a resistor 112 to the input 97 of amplifier 98. Input 97 of amplifier 98 is further connected to ground 68 by means of a resistor 113. Terminal 62 is connected by means of a capacitor 115 to a Schmitt trigger circuit 116. The output of Schmitt trigger 116 is connected by means of a capacitor 117 in series with a resistor 120 to the negative potential source 82. A junction 121 between capacitor 117 and resistor 120 is connected to the cathode 122 of a diode 123. The anode of diode 123 is connected to conductor 86.

Conductor 86 is further connected to the anodes of a diode 125, a diode 126, and a diode 127. The cathode 130 of diode 125 is connected by means of a conductor 131 to a terminal 132. The cathode 133 of diode 126 is connected by means of a conductor 134 to a terminal 135. The cathode 136 of diode 127 is connected by means of a conductor 137 to a terminal 138. Diodes 85, 123, 125, 126 and 127 form an "and" gate 139.

Conductor 86 is further connected to an input 140 of a bistable multivibrator 141. A second input 142 of bistable multivibrator 141 is connected to a terminal 143. An output 144 of multivibrator 141 is connected by means of a resistor 145 in series with a resistor 146 to the negative potential source 82. A junction 147 between resistors 145 and 146 is connected by means of a reverse poled diode 150 in series with a resistor 151 to the positive potential source 65. A junction 152 between diode 150 and resistor 151 is connected by means of a diode 153 to the input of a cathode follower 154. The output of cathode follower 154 is connected to an indicator unit 155.

Output 144 of multivibrator 141 is further connected by means of a capacitor 161 in series with a resistor 162 to the negative potential source 82. A junction 163 between capacitor 161 and resistor 162 is connected by means of a reverse poled diode 164 and a conductor 165 to the anode of a diode 166. The cathode 167 of diode 166 is connected to a terminal 168.

Conductor 165 is connected by means of a resistor 170 172 of a multivibrator 173. Input 172 of multivibrator 173 is further connected by means of a diode 174 to a movable contact 175 of a switch or relay 176. Relay 176 further has a fixed contact 177 which is connected directly to a positive potential source 178.

The output of multivibrator 173 is connected by means of a relay winding 180 of relay 181, in series with a resistor 182 to conductor 165. Relay 181 further has fixed contacts 183, 184, 185, 186, 187, 188, 189, 190, 191 and 192. Relay 181 further has a movable contact 193 associated with fixed contacts 183 and 184, a movable contact 194 associated with fixed contacts 185 and 186, a movable contact 195 associated with fixed contacts 187 and 188, a movable contact 196 associated with fixed contacts 189 and 190 and a movable contact 197 associated with fixed contacts 191 and 192.

A junction 200 between relay winding 180 and resistor 182 is connected by means of a resistor 201 to fixed contact 183 of relay 181. Movable contact 193 of relay 181 is connected by means of a conductor 202 to an output terminal 203.

A target speed resolver 205 has a first stator winding 206 having end terminals 207 and 208, a second stator winding 210 having end terminals 211 and 212, and a rotor winding 213 having end terminals 214 and 215. Terminals 214 and 215 of rotor winding 213 are connected to a source of alternating current energizing potential. Terminal 208 of resolver winding 206 is connected by means of a conductor 216 to fixed contact 186 of relay 180, while end terminal 207 of winding 206 is connected by means of a conductor 217 to fixed contact 188 of relay 181. End terminal 211 of winding 210 is connected by means of a conductor 220 to fixed contact 192 of relay 181, while terminal 212 of winding 210 is connected by means of a conductor 221 to fixed contact 190 of relay 181.

A Doppler echo resolver 223 has a first stator winding 224 having end terminals 225 and 226, a second stator winding 227 having end terminals 230 and 231, and a rotor winding 232 having end terminals 233 and 234.

End terminal 225 of resolver winding 224 is connected by means of a conductor 236 to the movable contact 195 of relay 181, while end terminal 226 of winding 224 is connected by means of a conductor 237 to the movable contact 194 of relay 181. End terminal 230 of resolver winding 227 is connected by means of a conductor 240 to the movable contact 197 of relay 181 while end terminal 231 of winding 227 is connected by means of a conductor 241 to the movable contact 196 of relay 181.

An output 242 of sawtooth oscillator 93 is connected to the indicator unit 155.

Figure 3:
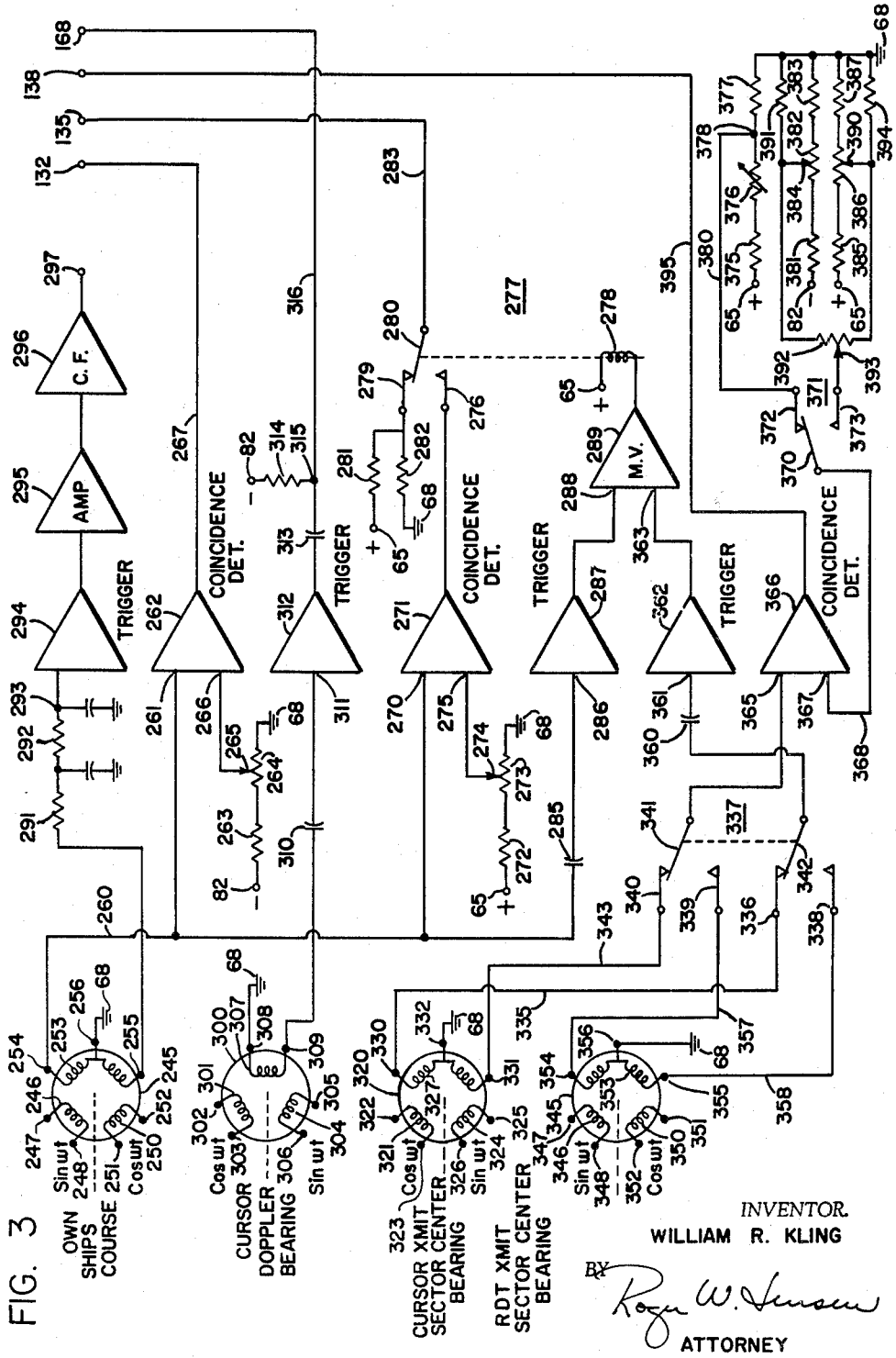

Referring to FIGURE 3 there is shown an own ship's course resolver 245. Resolver 245 has a first stator winding 246 having end terminals 247 and 248, and a second stator winding 250 having end terminals 251 and 252. Resolver 245 further has a rotor winding 253 having end terminals 254 and 255 and a center tap winding 256.

End terminals 247 and 248 of stator winding 246 are connected to a sinusoidal source, while end terminals 251 and 252 of stator winding 250 are connected to a cosinusoidal source. Center tap terminal 256 of rotor winding 253 of resolver 245 is connected to ground 68.

End terminal 254 of resolver winding 253 is connected by means of a conductor 260 to an input 261 of a coincidence detector 262. The negative potential source 82 is connected by means of a resistor 263 in series with a potentiometer 264 to ground 68. Potentiometer 264 has a wiper arm 265 which is connected to a second input 266 of coincidence detector 262. The output of coincidence detector 262 is connected by means of a conductor 267 to terminal 132 (see FIGURE 2).

End terminal 254 of resolver winding 253 is further connected by means of conductor 260 to an input 270 of a coincidence detector 271. The positive potential source 65 is connected by means of a resistor 272 in series with a potentiometer 273 to ground 68. Potentiometer 273 further has a wiper arm 274 which is connected to an input 275 of coincidence detector 271. The output of coincidence detector 271 is connected to a fixed contact 276 of a relay 277. Relay 277 further has a winding 278, a second fixed contact 279, and a movable contact 280. Fixed contact 279 of relay 277 is connected by means of a resitsor 281 to the positive potential source 65, and by means of a resistor 282 to ground 68. The movable contact 280 of relay 277 is connected by means of a conductor 283 to termial 135 (see FIGURE 2).

End terminal 254 of resolver winding 253 is connected by means of conductor 260 and a capacitor 285 to an input 286 of a trigger circuit 287. The output of trigger circuit 287 is connected to a first input 288 of a multivibrator 289. The output of multivibrator 289 is connected through relay winding 278 of relay 277 to the positive potential source 65.

End terminal 255 of winding 253 is connected by means of a resistor 291 in series with a resistor 292 to an input 293 of a Schmitt trigger 294. The output of trigger circuit 294 is connected through an amplifier 295 and a cathode follower 296 to an output terminal 297.

A cursor Doppler bearing resolver 300 has a first rotor winding 301 having end terminals 302 and 303, a second rotor winding 304 having end terminals 305 and 306, and a stator winding 307 having end terminals 308 and 309. End terminals 305 and 306 of rotor winding 304 of resolver 300 are connected to a sinusoidal source of energizing potential, while end terminals 302 and 303 of rotor winding 301 are connected to a cosinusoidal source of energizing potential.

End terminal 308 of stator winding 307 is connected directly to ground 68, while end terminal 309 of winding 307 is connected by means of a capacitor 310 to an input 311 of a trigger circuit 312. The output of trigger circuit 312 is connected by means of a capacitor 313 in series with a resistor 314 to the negative potential source 82. A junction 315 between capacitor 313 and resistor 314 is connected by means of a conductor 316 to terminal 168 (see FIGURE 2).

A cursor transmit sector center bearing resolver 320 has a first rotor winding 321 having end terminals 322 and 323, and a second rotor winding 324 having end terminals 325 and 326. Resolver 320 further has a stator winding 327 having end terminals 330 and 331 and a center tap terminal 322. End terminals 322 and 323 of resolver winding 321 are connected to a cosinusoidal source of energizing potential while end terminals 325 and 326 of resolver winding 324 are connected to a sinusoidal source of energizing potential.

Center tap terminal 322 of resolver winding 327 is connected to ground 68. End terminal 330 of resolver winding 327 is connected by means of a conductor 335 to a fixed contact 336 of a switch or relay 337. Switch 337 further has a fixed contact 338, a fixed contact 339, and a fixed contact 340. Switch 337 also has a movable contact 341 associated with fixed contact 339 and 340 and a movable contact 342 associated with fixed contacts 336 and 338. End terminal 331 of winding 327 of resolver 320 is connected by means of a conductor 343 to fixed contact 340 of switch 337.

An RDT transmit sector center bearing resolver 345 has a first stator winding 346 having end terminals 347 and 348, a second stator winding 350 having end terminals 351 and 352, and a rotor winding 353 having end terminals 354 and 355, and a center tap terminal 356. End terminals 347 and 348 of winding 346 of resolver 345 are connected to a sinusoidal source of energizing potential, while end terminals 351 and 352 of winding 350 are connected to a cosinusoidal source of energizing potential. Center tap terminal 356 of winding 353 of resolver 345 is connected to ground 68. End terminal 354 of winding 353 is connected by means of a conductor 357 to fixed contact 339 of switch 337, while end terminal 355 of winding 353 is connected by means of a conductor 358 to fixed contact 338 of switch 337.

Movable contact 342 of switch 337 is connected by means of a capacitor 360 to an input 361 of a trigger circuit 362. The output of trigger circuit 362 is connected to a second input 363 of multivibrator 289.

Movable contact 341 of switch 337 is connected to an input 365 of a coincidence detector 366. A second input 367 of coincidence detector 366 is connected by means of a conductor 368 to a movable contact 370 of a switch 371. Switch 371 further has a fixed contact 372 and a fixed contact 373.

The positive potential source 65 is connected by means of a resistor 375, a variable resistor 376 and a fixed resistor 377 to ground 68. A junction 378 between variable resistor 376 and fixed resistor 377 is connected by means of a conductor 380 to the fixed contact 372 of switch 371. The negative potential source 82 is connected by means of a fixed resistor 381, a potentiometer 382, and a fixed resistor 383 to ground 68. Potentiometer 382 further has a wiper arm 384. The positive potential source 65 is connected by means of a fixed resistor 385, a potentiometer 386, and a fixed resistor 387 to ground 68. Potentiometer 386 has a wiper arm 390.

Wiper arm 384 of potentiometer 382 is connected to ground 68 by means of a fixed resistor 391, and is further connected by means of a potentiometer 392 to the wiper arm 390 of potentiometer 386. Potentiometer 392 has a wiper arm 393. Wiper arm 390 of potentiometer 386 is connected to ground by means of a fixed resistor 394.

The wiper arm 393 of potentiometer 392 is connected directly to the fixed contact 373 of switch 371.

The output of coincidence detector 366 is connected by means of a conductor 395 to terminal 138 (see FIGURE 2).

Figure 4:
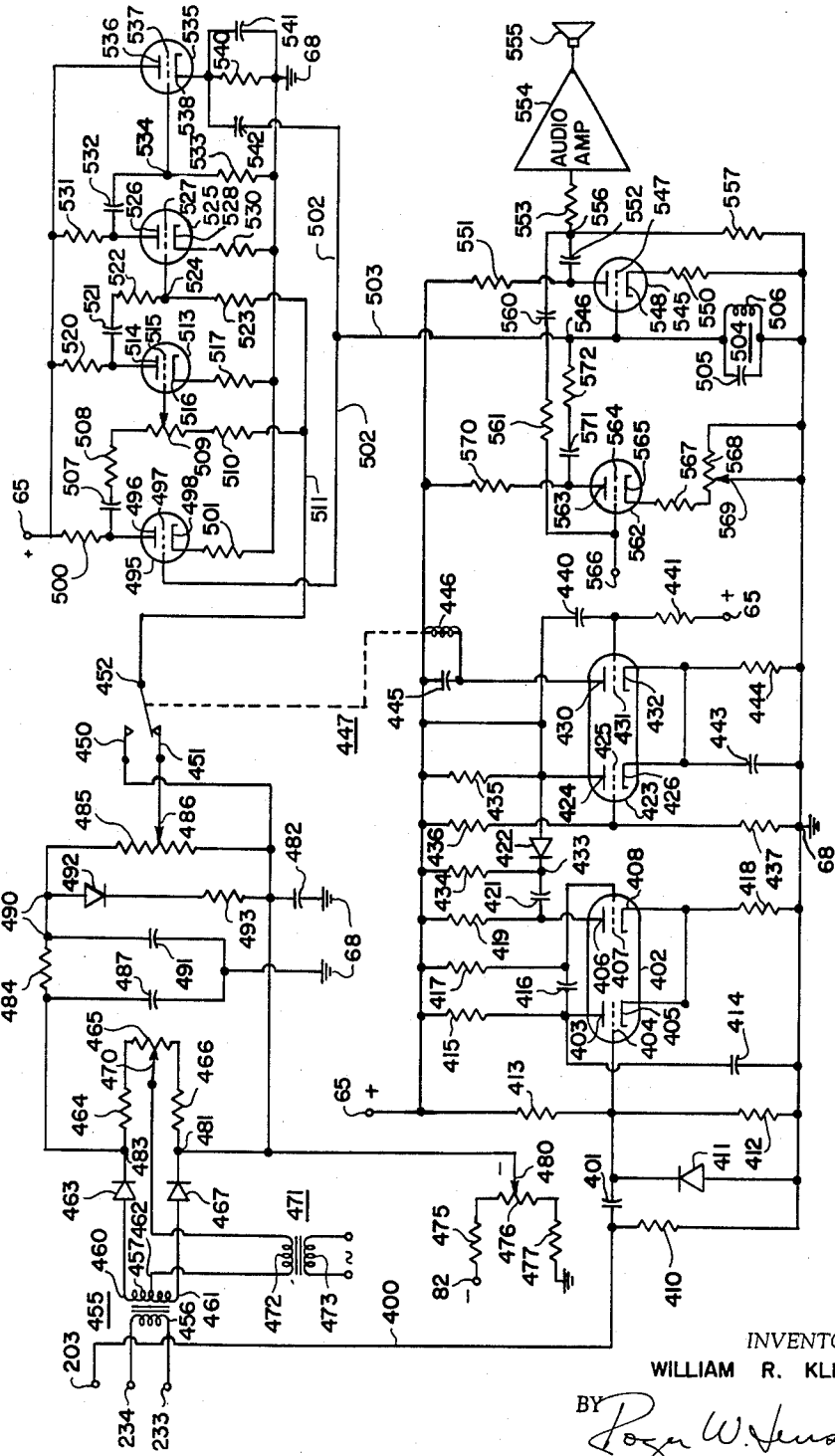
FIGURE 4 is a schematic representation of the Doppler generation circuits.

Referring to FIGURE 4 there is shown terminal 203 (see FIGURE 2). Terminal 203 is connected by means of a conductor 400 and a capacitor 401 to a grid 404 of a dual triode 402. Dual triode 402 further has a plate 403 and a cathode 404, a plate 406, a grid 407, and a cathode 408. Conductor 400 is connected by means of a resistor 410 to ground 68.

Grid 404 of dual triode 402 is connected by means of a reverse poled diode 411 in parallel with a resistor 412 to ground 68, and by means of a resistor 413 to the positive potential source 65. Plate 403 of dual triode 402 is connected by means of a capacitor 414 to ground 68, and by means of a resistor 415 to the positive potential source 65. Plate 403 is further connected by means of a capacitor 416 to the grid 407 of dual triode 402. Grid 407 of dual triode 402 is further connected by means of a resistor 417 to the positive potential source 65. Cathode 408 of dual triode 402 is directly connected to cathode 405, and by means of a resistor 418 to ground 68. Plate 406 of dual triode 403 is connected by means of a resistor 419 to the positive potential source 65, and by means of a capacitor 421 in series with a reverse poled diode 422 to a plate 424 of a dual triode 423. Dual triode 423 further has a grid 425, a cathode 426, a plate 430, a grid 431, and a cathode 432.

A junction 433 between capacitor 421 and diode 422 is connected by means of a resistor 434 to the positive potential source 65. Plate 424 of dual triode 423 is connected by means of a resistor 435 to the positive potential source 65. Grid 425 of dual triode 423 is connected by means of a resistor 436 to the positive potential source 65, and by means of a resistor 437 to ground 68. Plate 424 of dual triode 423 is connected by means of a capacitor 440 to the grid 431 of dual triode 423. Grid 431 is further connected by means of a resistor 441 to the positive potential source 65. Cathode 426 of dual triode 423 is connected directly to cathode 432, and is further connected by means of a capacitor 443 in parallel with a resistor 444 to ground 68. Plate 430 of dual triode 423 is connected by means of a capacitor 445 in parallel with a winding 446 of a relay 447 to the positive potential source 65. Relay 447 further has a first fixed contact 450, a second fixed contact 451 and a movable contact 452.

Terminals 233 and 234 (see FIGURE 2) are connected to a primary winding 456 of a transformer 455. Transformer 455 further has a secondary winding 457 having end terminals 460 and 461 and a center tap terminal 462. End terminal 460 of secondary winding 457 is connected by means of a diode 463, a resistor 464, a potentiometer 465, a resistor 466, and a reverse poled diode 467 to end terminal 461 of secondary winding 457. Potentiometer 465 has a wiper arm 470 which is connected by means of a secondary winding 472 of a transformer 471 to center tap terminal 462 of secondary winding 457. Transformer 471 further has a primary winding 473 which is adapted to be energized by a source of alternating current. Negative potential source 82 is connected by means of a resistor 475, a potentiometer 476, and a resistor 477 to ground 68. Potentiometer 476 has a wiper arm 480 which is connected to a junction 481 between resistor 466 and diode 467. Junction 481 is further connected by means of a capacitor 482 to ground 68 and is directly connected to fixed contact 450 of relay 477. A junction 483 between diode 463 and resistor 464 is connected by means of a resistor 484 in series with a potentiometer 485 to junction 481. Potentiometer 485 has a wiper arm 486 which is directly connected to fixed contact 451 of relay 447. Terminal 483 is further connected by means of a capacitor 487 to ground 68. A junction 490 between resistor 484 and potentiometer 485 is connected by means of a capacitor 491 to ground 68, and by means of a diode 492 in series with a resistor 493 to junction 481.

Transformer 455 and 571, diodes 463 and 467 and resistors 464, 465 and 466 comprise a phase discriminator whose output appears between terminals 481 and 483. The output of the discriminator is a D.C. signal related to the phase relationship of the signals appearing across primary windings 456 and 473 of transformers 455 and 471 respectively. A description of operation of such a discriminator may be found on page 368 of Active Networks by Vincent C. Rideout, Prentice-Hall, Inc., 1959.

A triode 495 has a plate 496, a grid 497, and a cathode 498. Plate 496 of triode 495 is connected by means of a resistor 500 of the positive potential source 65. Cathode 498 of triode 495 is connected by means of a resistor 501 to ground 68. Grid 497 of triode 495 is connected by means of a conductor 502, a conductor 503, and a resonant circuit 504 to ground 68. Resonant circuit 504 comprises a capacitor 505 in parallel with an inductance 506. Plate 496 of triode 495 is further connected by means of a capacitor 507, a fixed resistor 508, a potentiometer 509, a fixed resistor 510 and a conductor 511 to the movable contact 452 of relay 447. Potentiometer 509 has a wiper 512 which is connected to a grid 515 of a triode 513. Triode 513 further has a plate 514 and a cathode 516. Cathode 516 of triode 513 is connected by means of a resistor 517 to ground 68. Plate 514 of triode 513 is connected by means of a resistor 520 to the positive potential source 65, and by means of a capacitor 521, a resistor 522, and a resistor 523 to conductor 511. A junction 524 between resistors 522 and 523 is connected to a grid 527 of a triode 525. Triode 525 further has a plate 526 and a cathode 528. Cathode 528 of triode 525 is connected by means of a resistor 530 to ground 68. The plate 526 of triode 525 is connected by means of a resistor 531 to the positive potential source 65, and by means of a capacitor 532 in series with a resistor 533 to ground 68. A junction 534 between capacitor 532 and resistor 533 is connected to a grid 537 of a triode 535. Triode 535 further has a plate 536 and a cathode 538. Plate 536 of triode 535 is connected directly to the positive potential source 65. Cathode 538 of triode 535 is connected by means of a resistor 540 in parallel with a capacitor 541 to ground 68 and by means of a capacitor 542 and conductor 502 to the grid 497 of triode 495.

Conductor 503 is connected to a grid 547 of a triode 545. Triode 545 further has a plate 546 and a cathode 548. Cathode 548 of triode 545 is connected by means of a resistor 550 to ground 68. Plate 546 of triode 545 is connected by means of a resistor 551 to the positive potential source 65, and by means of a capacitor 552 in series with a resistor 553 to the input of an audio amplifier 554. The output of audio amplifier 554 is connected to a speaker 555. A junction 556 between capacitor 552 and resistor 553 is connected by means of a resistor 557 to ground 68, and by means of a capacitor 560 in series with a resistor 561 to a grid 564 of a triode 562. Triode 562 further has a plate 563 and a cathode 565. Grid 564 of triode 562 is connected to a terminal 566. Cathode 565 of triode 562 is connected by means of a fixed resistor 567 in series with a potentiometer 568 to ground 68. Potentiometer 568 has a wiper 569 which is connected to ground 68.

The plate 563 of triode 562 is connected by means of a resistor 570 to the positive potential source and by means of a capacitor 571 in series with a resistor 572 to the grid 547 of triode 549.

Referring to FIGURE 5 there is shown a transformer 580 having a primary winding 581 and a secondary winding 582. Secondary winding 582 has end terminals 583 and 584. Primary winding 581 of transformer 580 is adapted to be energized by a source of alternating potential. End terminal 583 of secondary winding 583 is connected by means of a Zener diode 585 in series with a reverse poled Zener diode 586 to end terminal 584 of winding 582. End terminal 583 is further connected by means of a capacitor 587 in parallel with an inductance 588 to end terminal 584. End terminal 583 is connected by means of a potentiometer 590 to end terminal 584 of secondary winding 582. Potentiometer 590 has a wiper arm 591 which is directly connected to a fixed contact 593 of a relay 592. Relay 592 further has a winding 594, a fixed contact 595 and a movable contact 596. Winding 594 of relay 592 is adapted to be connected by a suitable signal source (not shown) whenever a cursor is to be displayed on the indicator scope. Fixed contact 595 of relay 592 is connected by means of a resistor 597 to ground 68.

Movable contact 596 of relay 592 is connected directly to a grid 604 of a pentode 600. Pentode 600 further has a plate 601, a suppressor grid 602, a screen grid 603 and a cathode 605. Suppressor grid 602 of pentode 600 is connected directly to cathode 605. Cathode 605 of pentode 600 is connected by means of a resistor 606 to ground 68. Screen grid 603 of pentode 605 is connected by means of a resistor 607 to the positive potential source 65, and by means of a resistor 608 in parallel with a capacitor 609 to ground 68. Plate 601 of pentode 600 is connected by means of a capacitor 610 to the positive potential source 65.

A cursor generator resolver 611 has a rotor winding 612 having end terminals 613 and 614 and a center tap winding 615. Resolver 611 further has a first stator winding 616 having end terminals 617 and 618 and a second stator winding 620 having end terminals 621 and 622. End terminal 613 of rotor winding 612 is connected directly to center tap terminal 615, and is connected by means of a conductor 623 to the plate 601 of pentode 600. End terminal 614 of rotor winding 612 is connected to the positive potential source 65 by means of a conductor 624.

End terminal 617 of resolver stator winding 616 is connected by means of a potentiometer 625 to end terminal 618 of winding 616. Potentiometer 625 has a wiper arm 626 which is connected to a terminal 627 (see FIGURE 2) and from terminal 627 to indicator 155.

End terminal 621 of stator winding 620 of resolver 611 is connected by means of a potentiometer 630 to end terminal 622 of winding 620. Potentiometer 630 has a wiper arm 631 which is directly connected to a terminal 632 (see FIGURE 2), and from terminal 632 to indicator 155.

Movable contact 596 of relay 592 is connected by means of a conductor 635 to a grid 638 of a triode 636. Triode 636 further has a plate 637 and a cathode 639. Plate 637 of triode 636 is connected by means of a resistor 640 to the positive potential source 65, and by means of a resistor 641 in series with a resistor 642 to ground 68. A junction 643 between resistor 641 and 642 is connected to a grid 645 of a triode 643. Triode 643 further has a plate 644 and a cathode 646. Cathode 646 of triode 643 is connected by means of a resistor 650 in series with a resistor 651 to ground 68. A junction 652 between resistors 650 and 651 is directly connected to the cathode 639 of triode 636. Plate 644 of triode 643 is connected by means of a resistor 653 to the positive potential source. Positive potential source 65 is connected by means of a resistor 654, a potentiometer 655, and a resistor 656 to ground 68. Potentiometer 655 further has a wiper arm 657 which is directly connected to a grid 662 of a triode 660. Triode 660 further has a plate 661 and a cathode 663.

The plate 644 of triode 643 is connected by means of a capacitor 664 to the grid 662 of triode 663. The plate 661 of triode 660 is connected by means of a resistor 665 to the positive potential source 65, and by means of a capacitor 666 to a grid 671 of a triode 667. Triode 667 further has a plate 670 and a cathode 672. Grid 671 of triode 667 is connected by means of a resistor 673 to the positive potential source 65. Plate 670 of triode 667 is connected by means of a resistor 675 to a terminal 676 (see FIGURE 2) and from terminal 676 to indicator 155. Cathode 672 of triode 667 is connected by means of a resistor 677 to ground 68, and is further directly connected to the cathode 663 of triode 660.

The positive potential source 65 is connected by means of a resistor 680, a resistor 681, and a resistor 682 to ground 68. A junction 683 between resistors 681 and 682 is directly connected to the grid 638 of triode 636. A junction 684 between resistors 680 and 681 is connected by means of a potentiometer 685 to ground 68. Potentiometer 685 has a wiper arm 686 which is directly connected to ground 68.

*Operation*

Helipots 20, 21, 22, and 23 are all energized by alternating current signals.

Helipot 20 is energized by a sinusoidal source and the signal on the wiper 24 of helipot 20 represents the $y$ coordinate of a target. Helipot 21 is energized from a co-sinusoidal source and the signal on its wiper 25 represents the $x$ coordinate of the target. Helipot 22 is energized by a sinusoidal source and the signal on its wiper 26 represents the $y$ coordinate of own ship. The sinusoidal source which energizes helipot 22 is 180° out of phase with the sinusoidal source which energizes helipot 20. Similarly, helipot 23 is energized from a cosinusoidal source and the signal on its wiper 27 represents the $x$ coordinate of own ship. The cosinusoidal source which energized helipot 23 is 180° out of phase with the cosinusoidal source which energizes helipot 21.

The signals on the wipers 24, 25, 26, and 27 of the various helipots are fed through cathode follower circuits 30, 37, 42, and 53 respectively. Cathode followers 30, 37, 42 and 53 act as impedance matching devices and prevent the various helipots from being loaded by the remainder of the simulator circuitry.

The output of cathode follower 53, which is the $x$ axis position voltage of own ship, and the output of cathode follower 42, which is the $y$ axis position of own ship, are summed together by summing resistors 44 and 45. This "summed" voltage is applied to amplifier 46. The output of amplifier 46 is applied through capacitor 50 and resistor 51 to the summing input of amplifier 34.

The output of cathode follower 30, which is the $y$ axis position of the target is applied through capacitor 31 and resistor 32 to the summing input of amplifier 34. The output of cathode follower 37 which is the $x$ axis position of the target is applied through capacitor 40 and resistor 41 to the summing input of amplifier 34. Amplifier 34, with suitable range switching which controls the amount of feedback through variable feedback network 36, forms the first stage of amplification for the range detection circuitry. The output of amplifier 46 and the outputs of cathode followers 30 and 37 are algebraically summed in amplifier 34, the output appearing at output terminal 35 of amplifier 34 being coupled through capacitor 56 and resistor 57 to the input of amplifier 61. The "summed" signal is amplified in amplifier 61 and the output of amplifier 61 appearing at output terminal 62 is a sinusoidal voltage and is such that the amplitude of this sine wave is directly proportional to the range of the target with respect to the position of own ship, and the phase of this voltage is directly proportional to the bearing of the target with respect to the position of own ship.

Referring to FIGURE 2, the voltage appearing at terminal 62 is applied to rectifier circuit 73 which converts the A.C. voltage to a D.C. voltage whose amplitude is directly proportional to the range of the target with respect to the position of own ship.

The output of rectifier 73 is applied to the input 74 of coincidence detector 75. Coincidence detector 75 operates such that when the voltage input at input 74 is greater than the input at terminal 76, the output voltage from detector 75 is a negative voltage. If the voltage appearing at input 76 exceeds the voltage appearing at 74, than the output of coincidence detector 75 will change very rapidly from a negative voltage to a positive voltage.

The sawtooth sweep voltage originating in sawtooth oscillator 93 is applied from output 242 of oscillator 93 to the indicator unit 155 and produces a sweep on a cathode ray oscilloscope in indicator unit 155. The linear sawtooth voltage applied to indicator unit 155 is applied to a synchronous converter (not shown). The output of the synchronous converter is a chopped A.C. voltage whose amplitude is equal to the amplitude of the sawtooth voltgae generated by sawtooth oscillator 93. This chopped voltage is integrated by an integration circuit (not shown). The output of the integration circuit is applied to a resonant filter (not shown), which produces an output which is a sine wave whose amplitude is directly proportional to the amplitude of the sawtooth sweep at any particular instant. The sinusoidal voltage is applied to the cathode ray tube circuits of indicator 55 and produces a spiral sweep on the indicator scope.

The sawtooth sweep voltage originating in sawtooth oscillator 93 is coupled from output 94 of oscillator 93 through conductor 95 and resistor 96 to the input of amplifier 98. The output of amplifier 98 is coupled through a cathode follower 100 to the input 76 of coincidence detector 75. It can be readily seen that coincidence detector 75 will produce a positive output when the magnitude of the sawtooth signal applied to input 76 of detector 75 exceeds the magnitude of the D.C. signal applied to input 74 of detector 75.

The step function which appears at the output of coincidence detector 75 is differentiated in the input of multivibrator 77 such that a sharp trigger pulse is presented to the input of multivibrator 77. Since the spiral sweep voltage applied to the cathode ray tube of indicator 155 is directly proportional to the sawtooth wave appearing at the input of coincidence detector 75, the differentiated pulse which appears at the input of multivibrator 77 occurs at the same time that the range of the spiral sweep is equal to the range of the target. The output of bistable multivibrator 77 is applied to an "and" circuit composed of diodes 85, 123, 125, 126, and 127. The output of multivibrator 77 is applied to the cathode 84 of diode 85.

The output of "and" circuit 139 is applied to the input 140 of bistable multivibrator 141. The characteristics of "and" circuit 139 are such that if a possitive voltage exists simultaneously at the cathode side of diodes 85, 123, 125, 126, and 127, then a positive voltage will also exist at input 140 of bistable multivibrator 141. If one of the voltages applied to the cathode side of the diodes is negative, then the voltage which appears at input 140 of bistable multivibrator 141 is also negative. Thus it is essential that in order to obtain a trigger voltage at input 140 of bistable multivibrator 141, it is necessary for the voltages at the cathode side of diodes 85, 123, 125, 126, and 127 to be simultaneously positive.

As explained previously, the phase of the sinusoidal voltage appearing at terminal 62 is directly proportional to the bearing of the target with respect to the position of own ship. The voltage at terminal 62 is applied through capacitor 115 to the input of the Schmitt trigger 116. The Schmitt trigger operates such that a positive pulse appears at its output during the time that the sinusoidal wave input is positive. The trigger circuit 116 is adjusted so that the leading edge of the output positive pulse exists at the exact instant the sinusoidal input voltage is zero volts. The output pulse of trigger circuit 116 is differentiated by a network comprising capacitor 117 and resistor 120. This differentiated pulse is applied to the cathode 122 of diode 123 of "and" circuit 139. The time relationship of the pulse appearing at the cathode 122 of diode 123 is such that the pulse appears at the bearing angle of the target with respect to own ship's position.

Referring to FIGURE 3, the cosine output voltage of the Own Ship's Course resolver 245 appears at output terminal 254 and is coupled through conductor 260 and is applied to input 261 of coincidence detector 262, input 270 of coincidence detector 271, and through capacitor 285 to the input 286 of trigger circuit 287.

Coincidence detector 262 is similar to the range coincidence detector circuit 75 (see FIGURE 2). Coincidence detector 262 is adjusted such that its output is always positive except during a 60° wide pulse centered about the stern of own ship. The width of this pulse is adjusted by potentiometer 264. The output of coincidence detector 262 is called the "aft" blanking pulse, and is coupled through conductor 267 to terminal 132, and from terminal 132 through conductor 131 (see FIGURE 2) to the cathode 130 of diode 125 of "and" circuit 139. This "aft" blanking pulse is necessary since the simulated sonar does not receive targets within a sector ±30° of the ship's stern because of noise generated by the ship's screws.

The cosine output voltage of Own Ship's Course resolver 245 is, as explained previously, applied to input 270 of coincidence detector 271. Coincidence detector 271 is adjusted by means of potentiometer 274 such that the output of coincidence detector 271 is always a positive voltage except for a portion which is 60° wide, at which time it is a negative voltage. The 60° wide sector has a time relationship such that the negative pulse is centered about the bow of own ship. The negative output pulse of coincidence detector 271 is called the "forward" blanking pulse and is connected to fixed contact 276 of relay 277. When movable contact 280 of relay 277 makes contact with fixed contact 276 the "forward" blanking pulse is coupled through conductor 283 to terminal 135, and from terminal 135 through conductor 134 (see FIGURE 2) to the cathode 133 of diode 126 of "and" circuit 139. Since both the "aft" blanking pulse and the "forward" blanking pulse are negative pulses, it can be seen that during this blanking portion it is impossible for a pulse to trigger bistable multivibrator 141 (see FIGURE 2). Thus a target is prevented from appearing on the screen of the cathode ray tube of indicator 155 during the negative pulse portion of these blanking pulses.

The application of the "forward" blanking pulse is determined by relay 277. As explained previously, the simulated sonar utilizes a rotational directional transmission. If the transmission center bearing is in the forward 180° of the ship, relay 277 is deenergized. This results in a fixed positive voltage being coupled from positive potential source 65 through resistor 281, fixed contact 279 to movable contact 280 of relay 278, and conductor 283, to terminal 135, and from terminal 135 through conductor 134 (see FIGURE 2) to the cathode 133 of diode 126 of "and" circuit 139. During this state of relay 277 the "forward" blanking pulse is not permitted to exist at the "and" circuit 139.

If the transmission center bearing is in the aft 180° of the ship, then relay 277 is energized and the output of coincidence detector 271 is applied to diode 126 of "and" circuit 139. This results in the "forward" blanking pulse being applied to "and" circuit 139 with a resultant blanked out 60° wide sector about the bow of own ship. Trigger circuit 287, trigger circuit 362, and multivibrator 289 determine the state at which relay 277 operates.

The output of Own Ship's Course resolver 245 is applied to input 286 of trigger circuit 287. The sined signal output of the resolver used to determine the RDT sector center bearing is applied to the input of trigger 362. When the sonar is operated in the Search mode of operation the hand input RDT Xmit Sector Center Bearing control is employed. During the Attack mode of operation, the RDT Xmit and therefore the Cursor Xmit Sector Center Bearing resolver 320 is employed, resulting in the use of two different resolvers to accomplish the RDT Xmit sector center bearing operation.

Each of the trigger circuits 287 and 362 are adjusted so that an output positive pulse exists during the positive portion of the input sine wave signal, resulting in an output signal pulse, whose width is equal to 180°, from each of the two trigger circuits. The output of trigger circuit 287 is fed to the input 288 of multivibrator 289 and is differentiated in the input circuit of multivibrator 289 so that a narrow positive pulse approximately 5° wide is applied to an "and" circuit located in the input of multivibrator 289. The output of trigger 362, which is a 180° wide positive pulse, is coupled to the input terminal 363 of multivibrator 289 and is also applied to the "and" circuit in the input of multivibrator 289. The end result is that, if the output pulses of trigger circuits 287 and 362 are coincidents, then bistable multivibrator 289 is triggered. If multivibrator 289 is triggered, then relay 277 is not energized, and the forward blanking pulse is not applied to the target coincident "and" circuit 139. If the output pulses of trigger circuits 287 and 362 are not in coincidence, then bistable multivibrator 289 is not triggered and relay 277 is energized. This in turn causes movable contact 280 of relay 277 to make connection with fixed contact 276 and allows the "forward" blanking pulse from the output of coincidence detector 271 to be coupled to the cathode 133 of diode 126 of "and" circuit 139. It can be seen that the RDT sector center bearing resolvers 324 and 350 are adjusted such that the positive output pulse of trigger circuit 362 is in coincidence with the output pulse of trigger circuit 287 when the RDT Xmit center bearing resolvers are in the forward half of own ship. Switch 337 determines which of the resolvers, 320 or 345, is used to control the RDT Xmit sector center bearing.

The cosine output of the RDT Xmit Sector Center Bearing resolver 345 appears at terminal 354, while the cosine output of Cursor Xmit Sector Center Bearing appears at terminal 331. These cosine outputs are such that the phase of the cosine voltage is directly proportional to the setting of the resolvers. The cosine voltage is applied to the input 365 of coincidence detector 366. Coincidence detector 366 is connected in a manner similar to that of coincidence detectors 262 and 271 which generate the "aft" and "forward" blanking pulses. Input 367 of coincidence detector 366 is connected by means of a conductor 368 to the movable contact 370 of switch 371. Movable contact 370 either makes connection with fixed contact 372, in which case a fixed positive potential will be applied to input 367 of coincidence detector 366, or movable contact 370 can make connection with fixed contact 373 in which case either a positive or a negative potential, depending upon the setting of wiper 393 of potentiometer 392, may be applied to input 367 of coincidence detector 366. The magnitude of the signal applied to input 367 of coincidence detector 366 determines the pulse width of the output pulse from detector 366. When movable contact 370 makes connection with fixed contact 372 the potential applied to input 367 is such that the output from coincidence detector 366 will be a pulse 30° wide. The potential applied to input 367 of coincidence detector 366 can be varied by the setting of wiper 393 of potentiometer 392 such that the output pulse of coincidence detector 366 has a pulse width which is variable from 20° to 300°. The output pulse of coincidence detector 366 is coupled through conductor 395 to terminal 138, and from terminal 138 through conductor 137 (see FIGURE 2) to the cathode 136 of diode 127 of "and" gate 139. Since, as expalined previously, bistable multivibrator 141 can only be triggered when all of the signals applied to the cathodes of the various diodes in "and" gate 139 are positive, it can be seen that bistable multivibrator 141 can only be triggered when the output of coincidence detector 366 is positive, and that this time is variable depending upon the setting of potentiometer 392. Furthermore, since the cosine outputs of resolvers 320 and 345 have a phase which varies in accordance with the RDT Xmit bearing, it can be seen that the output of coincidence detector 366 will also vary in accordance with the RDT Xmit bearing, and hence a target can only be displayed on the scope of indicator 155 if the target occurs during the output pulse of coincidence detector 366.

As explained previously, when a positive pulse is applied to each of the cathodes of the diodes of "and" gate 139, a positive pulse appears at the "and" gate output and is coupled to input 140 of bistable multivibrator 141. The characteristic of bistable multivibrator 141 is such that when a pulse is applied to input 140 the output voltage appearing at terminal 144 rises to a relatively high positive potential. When a pulse is applied to input 142 of bistable multivibrator 141 the output voltage at terminal 144 drops to a relatively low positive potential. Bistable multivibrator 141 remains in either of the two described conditions until a driving pulse from the opposite condition is applied. The pulse applied to pin 140 of bistable multivibrator 141 is called the trigger pulse and the pulse which is applied to terminal 142 of multivibrator 141 is called the reset pulse. The output voltage at terminal 144 of multivibrator 141 is summed with the negative potential source 82 through resistor 145 and 146 respectively. The resultant voltage is applied to the cathode of diode 150 and is a voltage which is slightly negative during the time that multivibrator 141 is in the reset condition and is a positive voltage during the time that multivibrator 141 is in a triggered condition. When the cathode of diode 150 is positive, during the triggered state of multivibrator 141, a positive pulse appears at junction 152 and is coupled through diode 153 and cathode follower 154 to a video amplifier (not shown) in the indicator unit 155. The output of the video amplifier is applied to the cathode ray tube to provide a target indication. Terminal 142 of multivibrator 141 is connected to terminal 143 which is adapted to be connected to a suitable source of reset pulses for resetting multivibrator 141.

Referring again to FIGURE 3, the sine output of the Own Ship's Course resolver, appearing at terminal 255 of resolver 245, is coupled through resistors 291 and 292 to the input of trigger circuit 294. The output of trigger 294 is a negative pulse of approximately 180° width. Trigger 294 is adjusted such that the leading edges of the negative pulse is located exactly at the stern line bearing of own ship. The negative pulse which appears at the output of trigger 294 is differentiated in the input of amplifier 295 and the positive portion of the differentiated signal is removed by diode action. The negative pulse is amplified in amplifier 295 and is then applied through the cathode follower 296 to terminal 297. Terminal 297 is adapted to be connected to the video amplifier in indicator unit 155 and the output of the video amplifier will be applied to the cathode ray tube to present a stern line. The stern line is the line which appears on the face of the cathode ray tube in conjunction with the spiral sweep and which presents a straight line on the screen at the bearing indicating the loction of the stern of own ship.

The Cursor Doppler Bearing resolver 300 produces an alternating output voltage at terminal 309. This A.C. voltage has a constant amplitude and a phase that varies with the bearing setting of the cursor. The output of resolver 300 is coupled from terminal 309 through capacitor 310 to the input 311 of trigger circuit 312. Resolver 300 and trigger circuit 312 are adjusted such that a 180° wide positive output pulse appears at the output of trigger circuit 312. This output pulse has its leading edge located at the time relationship which is equal to the bearing setting of the cursor. The output pulse is differentiated by a network comprising capacitor 313 and resistor 314, resulting in a positive pulse approximately 16° wide which is coupled through conductor 316 to terminal 168, and from terminal 168 to the cathode 167 of diode 166 (see FIGURE 2). The triggered output voltage at terminal 144 of multivibrator 141 is differentiated by the network comprising capacitor 161 and resistor 162. A positive pulse is then applied to the cathode of diode 164 at a time relationship equal to the bearing of the target. A fixed positive voltage is applied to the cathode of diode 174 through switch 176. Diodes 164, 166 and 174 form an "and" circuit for the input trigger of bistable multivibrator 173. The width of the pulses appearing at diodes 164 and 166 are such that coincidence can be achieved over a sector approximately 16° wide. When pulses appear at the cathodes of diodes 164 and 166 a pulse appears on conductor 171 and is coupled to the input of bistable multivibrator 173. This pulse triggers multivibrator 173 and causes relay 180 to be deenergized. When relay 180 is deenergized, the target ship speed resolver 205 is connected to the Doppler echo resolver 223, which is connected to the cursor bearing shaft. The outputs of resolver 205 are x and y coordinate rate signals. These signals are summarized in the Doppler echo resolver 223 to provide an alternating signal proportional to target speed along the line of sound between the two ships. The phase of this output voltage determines whether the target is approaching own ship or moving away from own ship. The deenergization of relay 180 generates a positive voltage which is coupled through resistor 201, fixed contact 183 to movable contact 193 of relay 180 and conductor 202 to terminal 203. This gate signal is used hereinafter in the Doppler echo generation circuit. The alternating signal which appears at terminals 233 and 234 of Doppler echo resolver 223 has an amplitude which is equal to the rate of the target with respect to own ship and a phase which varies in accordance with increasing or decreasing range.

Referring to FIGURE 4, the signal appearing at terminals 233 and 234, the output of Doppler echo resolver 223, is coupled to the primary 456 of transformer 455. The signal appearing at the secondary 457 of transformer 455 is discriminated to produce a D.C. voltage on the wiper 486 of potentiometer 485. The polarity of the signal existing at the wiper 486 of potentiometer 485 indicates an approaching or receding target while the amplitude of the D.C. signal indicates the rate. In other words, the signal on wiper 486 is more negative when the target is moving away from own ship and is more positive when the target is moving toward own ship. If target range is not varying with respect to own ship, then a constant negative voltage will appear on the wiper 486 of potentiometer 485.

Triodes 495, 513, 525 and 535 form a cascaded variable gain amplifier whose input at the grid 497 of triode 495 is directly across the 800-cycle resonant circuit formed by capacitor 505 and inductor 506. The resonant circuit forms the tuning necessary to give the 800-cycle noise for reverberation and sea noise simulation. The effective amount of capacity occurring between grid 497 of tube 495 and ground 68 is a function of the grain of the cascaded amplifier comprising triodes 495, 513, 525 and 535. The gain of the amplifier is dependent upon the negative bias voltage applied at grid 527 of triode 525 through resistor 523, and at grid 515 of triode 513 through resistors 509 and 510. Thus, as the bias voltage on the grids of triodes 513 and 525 becomes more negative the gain of the amplifier decreases. The effective input capacity at grid 497 of triode 495 is also reduced. If the effective input capacity to triode 495 becomes less the frequency of the resonant circuit comprising capacitor 505 and inductor 506 becomes greater. The end result is that the more negative the value of the bias voltage which is applied to triodes 513 and 525 the higher the frequency of the reverberation and noise will be. The frequency of resonant circuit 504 is amplified in triode 545 and is coupled through capacitor 552 and resistor 553 to audio amplifier 554. Tank circuit 504 and triode 545, together with associated biasing circuitry, form a voltage controlled oscillator whose frequency of oscillation is controlled through the cascaded amplifier by the variations in the bias voltage on grids of triodes 513 and 525. The output of audio amplifier 554 is coupled to speaker 555 to provide an audio presentation.

It will be noted that the Doppler echo voltage which appears on wiper 486 of potentiometer 485 is applied to fixed contact 551 of relay 447. In the normally energized position, movable contact 452 of relay 447 will make contact with fixed contact 450, and hence a constant negative voltage from the wiper arm 480 of potentiometer 476 will be coupled to the grids of triodes 513 and 525 to form the bias voltage for these tubes. At the instant it is desired to trigger the Doppler echo, relay 447 is deenergized. This in turn provides the same bias voltage to the cascaded amplifier comprising triodes 495, 513, 525, and 535 as that which appears on the wiper 486 of potentiometer 485. The voltage on the wiper 486 of potentiometer 485 is dependent upon the rate of movement of the target with respect to own ship. A resonant frequency of resonant circuit 504 is changed in accordance with the target rate. Relay 447 is the Doppler echo relay and is in the plate circuit of a stable multi-vibrator 423. The Doppler gate signal appearing at terminal 203 is coupled through conductor 400 and capacitor 401 to the grid 404 of dual triode 402. This signal is amplified in dual triode 402 and the output pulse appearing on the plate 406 of dual triode 402 is differentiated and the negative portion of the differentiated signal is used to trigger a stable multivibrator 423. This results in multivibrator 423 being triggered some delayed time after the Doppler gate signal is generated by the deenergization of relay 181 (see FIGURE 2). This delay in triggering multivibrator 423 is necessary so that the output of the Doppler detector discriminator appearing on wiper 486 of potentiometer 485 has sufficient time to reach the full value of output D.C. voltage in accordance with the movement rate of the target being presented at this particular instant.

A white noise signal is applied to terminal 566 and is coupled to the grid 564 of triode 562. This white noise signal is amplified in triode 562 and the output appearing at plate 563 is coupled to capacitor 571 and resistor 572 and is applied to the resonant circuit 504. The output of the resonant circuit is applied to the grid 547 of triode 545. The output from the plate 546 of triode 545 is coupled through capacitor 552, capacitor 560, and resistor 561 to the grid 564 of triode 562. The end result is a feedback amplifier which is a slightly under damped circuit. Thus, the output signal at the plate 546 of triode 545 is a high frequency noise which is modulated at an extremely erratic 800 cycle rate. This voltage is the noise and reverberation voltage. This signal is coupled through resistor 553 and audio amplifier 554 to speaker 555.

FIGURE 5 shows the cursor generation circuit. Referring to FIGURE 5 there is shown transformer 580 having its primary winding 581 energized from the line frequency. The output from the secondary 582 of transformer 580 is clipped in both the positive and negative directions by Zener diodes 585 and 586. This action results in a clipped sinusoidal wave which is filtered in a very high Q resonant circuit comprising capacitor 587 and conductor 588. The output of the high Q circuit is a sine wave of excellent amplitude regulation and very low distortion. The amplitude of this sine way is adjusted by potentiometer 590, placed across the output of the LC parallel circuit. This circuit forms the line voltage regulator and wave shaper. The output from wiper 591 of potentiometer 590 is coupled to a fixed contact 593 of a relay 592. In its deenergized state, relay 592, the curser relay, has movable contact 596 in connection with fixed contact 595 thereby resulting in a grounding of the grid 604 of pentode 600 and a disabling of the curser generating circuit. Winding 594 of relay 592 is adapted to be energized through the cursor switch (not shown) so that when winding 594 is energized movable contact 596 is connected to fixed contact 593. The sinusoidal potential on the wiper 591 of potentiometer 590 is then coupled through relay 592 to the grid 604 of power amplifier 600. The cursor power amplifier 600 has the cursor bearing resolver 611 connected in the plate circuit such that the power amplifier applies the cursor calibration voltage across the resolver. The $x$ and $y$ outputs from output windings 620 and 616 respectively of the cursor bearing resolver are applied to respective cursor range potentiometers 630 and 625. The voltage which exists at the wipers of the two potentiometers form the $x$ and $y$ cursor deflection voltage, the $x$ deflection voltage appearing on wiper 631 of potentiometer 630 and the $y$ deflection voltage appearing on wiper 626 of potentiometer 625. These voltages are coupled to terminals 632 and 627 and from terminals 632 and 627 to indicator unit 155 (see FIGURE 2).

Since sweep of the cursor signal is relatively fast, it is necessary to provide an intensity pulse to the control grid of the cathode ray tube during the time that the cursor is applied to the deflection amplifiers so that the cursor may be readily visible on the screen of the cathode ray tube. This is accomplished by a circuit composed of tubes 636, 643, 660, and 667. The intensity pulse is adjusted such that the width of the pulse is equal to one-quarter of the cursor sine wave cycle. This causes only that portion of the cursor signal originating from the center of the cathode ray tube screen, and which moves out to the end of the cursor during the outgoing portion of the spot movement, to be observed on the screen of the cathode ray tube. The signal which drives cursor power amplifier 600 is also applied to the input of Schmitt trigger comprising 636 and 643. This signal is coupled from the movable contact 596 of relay 592 through conductor 635 to the grid 638 of triode 636. The Schmitt trigger is adjusted by potentiometer 685 so that the intensity pulse originates at the instant the cursor sweep voltage is at zero volts. The output of the Schmitt trigger, from the plate 644 of triode 643, is differentiated and is used as a signal to trigger the bistable multivibrator comprising triodes 660 and 667 and their associated circuitry.

The pulse width of the bistable multivibrator is adjusted by the cursor intensity sweep length potentiometer 655. Potentiometer 655 is adjusted so that only one-quarter of the cursor sweep sine wave is observed on the screen of the cathode ray tube. The output of the bistable multivibrator is taken from the plate 670 of triode 667 and is coupled through resistor 675 to terminal 676, and from terminal 676 to the indicator unit 155 (see FIGURE 2).

It is to be understood that while I have shown a specific embodiment of my invention, that this is for the purpose of illustration only and that my invention is to be limited solely by the scope of the appended claims.

What I claim is:

1. A sonar simulator comprising:
means for generating a first signal having an amplitude indicative of own ship's range and a phase indicative of own ship's bearing;
means for generating a second signal having an amplitude indicative of target range and a phase indicative of target bearing;
means for algebraically summing said first and second signals to produce a third signal, said third signal having an amplitude indicative of the relative range of said target from said own ship and a phase indicative of the bearing of said target relative to said own ship;
rectifier means connected to receive said third signal, said rectifier means producing a D.C. output signal having a magnitude indicative of the relative range of said target from said own ship;
a video display device;
a sawtooth sweep voltage generator;
means connecting said sawtooth sweep voltage generator to said video display device;
a coincidence circuit having first and second inputs and an output;
and "and" gate having an output and at least a first and a second input;
means connecting the output of said coincidence circuit to the first input of said "and" gate;
means connecting the first input of said coincidence circuit so as to receive the D.C. output signal from said rectifier means;
means connecting the second input of said coincidence circuit to said sawtooth sweep voltage generator, said coincidence circuit producing an output which enables the first input of said "and" gate whenever the magnitude of the sawtooth sweep voltage exceeds the magnitude of the D.C. output signal of said rectifier means;
a trigger circuit connected to receive said third signal and operable to produce an output pulse indicative of the phase of said third signal;
means connecting the "and" gate to said trigger circuit so that the second input of said "and" gate is enabled by the trigger circuit output pulse, said "and" gate producing a pulse at its output whenever all of its inputs are enabled; and
means responsive to the "and" gate output pulse for producing a target indication on said video display device.

2. A sonar simulator comprising:
resolver means having a cosine output signal whose phase is directly proportional to transmit sector bearing;
coincidence means having first and second inputs and an output;
an "and" gate having a first, a second, and a third input and an output;
means for generating a first signal indicative of target range connected to the first input of said "and" gate;
means for generating a second signal indicative of target bearing connected to the second input of said "and" gate;
a variable bias supply;
a fixed bias supply;
switch means operable to apply either said variable bias supply or said fixed bias supply to the first input of said coincidence means;
means connecting said resolver output signal to the second input of said coincidence means, said coincidence means producing a third signal indicative of transmit sector bearing whenever the magnitude of said resolver output signal exceeds the magnitude of the bias signal; and
means connecting the output of said coincidence means to the third input of said "and" gate whereby said third signal enables the third input of said "and" gate.

3. A sonar simulator comprising:
display means;
cursor generating means;
means connecting said cursor generating means to said display means;
signal producing means connected to said cursor generating means for producing a signal whose phase is indicative of the bearing of said cursor;
trigger generating means connected to said signal producing means, said trigger generating means producing an output pulse having a leading edge indicative of the cursor bearing;
differentiating means connected to receive the output pulse from said trigger generating means and operable to produce an output pulse having a predetermined pulse width centered on the cursor bearing;
an "and" gate having at least first and second inputs and an output;
means for applying the output pulse from said differentiating means to the first input of said "and" gate;
means for applying a signal indicative of a target bearing to the second input of said "and" gate, said "and" gate producing an output pulse when the signals at its input are time coincident;
first resolver means having outputs indicative of x and y coordinate rate signals of a target;
second resolver means;
switch means operable in response to the output of said "and" gate for connecting the outputs of said first resolver means to the inputs of said second resolver means;
means connecting the second resolver means to said cursor generating means, said second resolver means producing an output signal proportional to target speed along the cursor bearing;
discriminator means connected to receive the output signal from said second resolver means, said discriminator means producing a D.C. output signal whose polarity is indicative of an approaching or receding target and whose amplitude is indicative of the rate at which the target is approaching or receding;
a voltage controlled oscillator; and
means connecting the output of said discriminator in controlling relation to said voltage controlled oscillator.

4. A sonar simulator comprising:
resolver means having an output signal whose phase is directly proportional to transmit sector bearing;
coincidence means having first and second inputs and an output;
an "and" gate having a first, a second, and a third input and an output;
means for generating a first signal indicative of target range connected to the first input of said "and" gate;

means for generating a second signal indicative of target bearing connected to the second input of said "and" gate;

a variable bias supply;

means connecting said variable bias supply to the first input of said coincidence means;

means connecting said resolver output signal to the second input of said coincidence means, said coincidence means producing a third signal indicative of transmit sector bearing whenever the magnitude of said resolver output signal exceeds the magnitude of the bias signal; and means connecting the output of said coincidence means to the third input of said "and" gate whereby said third signal enables the third input of said "and" gate.

5. A sonar simulator comprising:

first signal producing means for producing a first signal whose phase is indicative of cursor bearing;

trigger generating means connected to said signal producing means, said trigger generating means producing an output pulse having a leading edge indicative of cursor bearing;

differentiating means connected to receive the output pulse from said trigger generating means and operable to produce an output pulse having a predetermined pulse width centered on the cusror bearing;

an "and" gate having at least first and second inputs and an output;

means for applying the output pulse from said differentiating means to the first input of said "and" gate;

means for applying a signal indicative of a target bearing to the second input of said "and" gate, said "and" gate producing an output pulse when the signals at its input are time coincident;

second signal producing means having outputs indicative of $x$ and $y$ coordinate rate signals of a target;

third signal producing means;

switch means operable in response to the output of said "and" gate for connecting the outputs of said second signal producing means to the inputs of said third signal producing means, said third signal producing means producing an output signal proportional to target speed along the cursor bearing;

discriminator means connected to receive the output signal from said third signal producing means, said discriminator means producing a D.C. output signal whose polarity is indicative of an approaching or receding target and whose amplitude is indicative of the rate at which the target is approaching or receding;

a voltage controlled oscillator; and means connecting the output of said discriminator in controlling relation to said voltage controlled oscillator.

6. A sonar simulator comprising:

first resolver means having outputs indicative of $x$ and $y$ coordinate rate signals of a target;

second resolver means;

means connecting the outputs of said first resolver means to the inputs of said second resolver means;

means operating the shaft of said second resolver means in accordance with the bearing of a cursor, said second resolver means producing an output signal proportional to target speed along the cursor bearing;

discriminator means connected to receive the output signal from said second resolver, said discriminator means producing a D.C. output signal whose polarity is indicative of an approaching or receding target and whose amplitude is indicative of the rate at which the target is approaching or receding;

a voltage controlled oscillator; and means connecting the output of said discriminator in controlling relation to said voltage controlled oscillator.

7. A sonar simulator comprising:

means for generating a first signal having an amplitude indicative of the relative range of a target from an own ship and a phase indicative of the bearing of said target relative to said own ship;

rectifier means connected to receive said first signal, said rectifier means producing a D.C. output signal having a magnitude indicative of the relative range of said target from said own ship;

a video display device;

a sawtooth sweep voltage generator;

means connecting said sawtooth sweep voltage generator to said video display device;

a coincidence circuit having first and second inputs and an output;

an "and" gate having an output and at least a first and a second input;

means connecting the output of said coincidtnce circuit to the first input of said "and" gate;

means connecting the first input of said coincidence circuit so as to receive the D.C. output signal from said rectifier means;

means connecting the second input of said coincidence circuit to said sawtooth sweep voltage generator, said coincidence circuit producing an output which enables the first input of said "and" gate whenever the magnitude of the sawtooth sweep voltage exceeds the magnitude of the D.C. output signal of said rectifier means;

a trigger circuit connected to receive said first signal and operable to produce an output pulse indicative of the phase of said first signal;

means connecting the "and" gate to said trigger circuit so that the second input of said "and" gate is enabled by the trigger circuit output pulse, said "and" gate producing a pulse at its output whenever all of its inputs are enabled; and means responsive to the "and" gate output pulse for producing a target indication on said video display device.

8. A sonar simulator comprising:

means for generating a first sinusoidal signal indicative of the $y$ coordinate of own ship's position;

means for generating a first cosinusoidal signal indicative of the $x$ coordinate of own ship's position;

means for generating a second sinusoidal signal indicative of the $y$ coordinate of target position;

means for generating a second cosinusoidal signal indicative of the $x$ coordinate of target position;

means for algebraically summing said first sinusoidal signal and said first cosinusoidal signal to produce a third signal having an amplitude indicative of own ship's range and a phase indicative of own ship's bearing;

means for algebraically summing said second sinusoidal signal and said second cosinusoidal signal to produce a fourth signal having an amplitude indicative of target range and a phase indicative of target bearing;

means for algebraically summing said third and fourth signals to produce a fifth signal, said fifth signal having an amplitude indicative of the relative range of said target from said own ship and a phase indicative of the bearing of said target relative to said own ship;

rectifier means connected to receive said fifth signal, said rectifier means producing a D.C. output signal having a magnitude indicative of the relative range of said target from said own ship;

a video display device;

a sawtooth sweep voltage generator;

means connecting said sawtooth sweep voltage generator to said video display device;

a coincidence circuit having first and second inputs and an output;

an "and" gate having an output and at least a first and second input;

means connecting the output of said coincidence circuit to the first input of said "and" gate;

means connecting the first input of said coincidence circuit so as to receive the D.C. output signal from said rectifier means;

means connecting the second input of said coincidence circuit to said sawtooth sweep voltage generator, said coincidence circuit producing an output which enables the first input of said "and" gate whenever the magnitude of the sawtooth sweep voltage exceeds the magnitude of the D.C. output signal of said rectifier means;

a trigger circuit connected to receive said fifth signal and operable to produce an output pulse indicative of the phase of said signal;

means connecting the "and" gate to said trigger circuit so that the second input of said "and" gate is enabled by the trigger circut output pulse, said "and" gate producing a pulse at its output whenever all of its inputs are enabled; and means responsive to the "and" gate output pulse for producing a target indication on said video display device.

9. A sonar simulator comprising:

coincidence means having first and second inputs and an output;

an "and" gate having a first, a second, and a third input and an output;

means for generating a first signal indicative of target range connected to the first input of said "and" gate;

means for generating a second signal indicative of target bearing connected to the second input of said "and" gate;

a variable bias supply;

a fixed bias supply;

switch means operable to apply either said variable bias supply or said fixed bias supply to the first input of said coincidence means;

means for generating a third signal whose phase is directly proportional to transmit sector bearing connected to the second input of said coincidence means, said coincidence means producing a fourth signal indicative of transmit sector bearing whenever the magnitude of said third signal exceeds the magnitude of the bias signal; and means connecting the output of said coincidence means to the third input of said "and" gate whereby said fourth signal enables the third input of said "and" gate.

References Cited in the file of this patent
UNITED STATES PATENTS

| | | |
|---|---|---|
| 2,693,647 | Bolster et al. | Nov. 9, 1954 |
| 2,924,892 | Swift | Feb. 16, 1960 |
| 2,955,361 | Brown | Oct. 11, 1960 |
| 2,969,599 | Nye et al. | Jan. 31, 1961 |